(12) United States Patent
Thulin (10) Patent No.: US 9,278,337 B2
(45) Date of Patent: Mar. 8, 2016

(54) VISIBLE LIGHT TITANIA PHOTOCATALYST, METHOD FOR MAKING SAME, AND PROCESSES FOR USE THEREOF

(75) Inventor: Lukas M. Thulin, Arlington, MA (US)

(73) Assignee: Nanoptek Corporation, Concord, MA (US)

( * ) Notice: Subject to any disclaimer, the term of this patent is extended or adjusted under 35 U.S.C. 154(b) by 1147 days.

(21) Appl. No.: 13/111,922

(22) Filed: May 19, 2011

(65) Prior Publication Data

US 2012/0292177 A1    Nov. 22, 2012

(51) Int. Cl.
| | |
|---|---|
| C01B 3/02 | (2006.01) |
| B01J 21/06 | (2006.01) |
| B01J 27/24 | (2006.01) |
| C01B 3/04 | (2006.01) |
| B01J 37/04 | (2006.01) |
| B01J 37/08 | (2006.01) |
| B01J 37/14 | (2006.01) |
| B01J 23/38 | (2006.01) |
| B01J 27/22 | (2006.01) |
| B01J 35/00 | (2006.01) |

(52) U.S. Cl.
CPC .............. *B01J 21/063* (2013.01); *B01J 23/38* (2013.01); *B01J 27/22* (2013.01); *B01J 27/24* (2013.01); *B01J 35/002* (2013.01); *B01J 35/004* (2013.01); *B01J 35/008* (2013.01); *B01J 35/0013* (2013.01); *B01J 37/04* (2013.01); *B01J 37/08* (2013.01); *B01J 37/14* (2013.01); *C01B 3/042* (2013.01); *Y02E 60/364* (2013.01)

(58) Field of Classification Search
USPC ......... 502/1, 5, 159, 227, 230, 339, 345, 350; 428/148, 248.1, 255.11, 408, 457, 469, 428/697; 422/186, 186.3; 210/748.01, 210/748.1; 250/340; 106/285; 423/69, 76, 423/598, 610
See application file for complete search history.

(56) References Cited

U.S. PATENT DOCUMENTS

| | | | | |
|---|---|---|---|---|
| 7,820,584 | B2 * | 10/2010 | Ishibai et al. .................. | 502/227 |
| 2004/0058149 | A1 * | 3/2004 | Zhou et al. ..................... | 428/328 |
| 2005/0226761 | A1 * | 10/2005 | Orth-Gerber et al. ........ | 420/417 |
| 2009/0170693 | A1 * | 7/2009 | Ikeda ............................. | 502/158 |
| 2010/0058954 | A1 * | 3/2010 | Kisch ............................ | 106/285 |
| 2011/0301018 | A1 * | 12/2011 | Li et al. ............................ | 502/5 |

FOREIGN PATENT DOCUMENTS

| | | |
|---|---|---|
| CN | 101791564 A * | 8/2010 |
| WO | WO 2010021454 A3 * | 4/2010 |

* cited by examiner

*Primary Examiner* — Walter D Griffin
*Assistant Examiner* — Cameron J Allen
(74) *Attorney, Agent, or Firm* — David J. Cole (57) ABSTRACT

Titania having high visible light photocatalytic activity is prepared by (a) mixing titania with carbon powder; (b) heating the titania/carbon powder mixture to at least about 1000° C. in an inert or weakly reactive atmosphere; and (c) thereafter heating the resultant powder mixture to a temperature in the range of about 350 to about 1000° C. in an oxidizing atmosphere. The resultant titania may be used for detoxifying or disinfecting liquids for gases, for generating hydrogen from aqueous media and in sunscreens and sunglasses.

16 Claims, 8 Drawing Sheets

VISIBLE LIGHT TITANIA PHOTOCATALYST, METHOD FOR MAKING SAME, AND PROCESSES FOR USE THEREOF

BACKGROUND OF INVENTION

This invention relates to a visible light titania photocatalyst, a method for making same, and processes for use of this catalyst.

The entire contents of all U.S. patents and published patent applications referred to below are herein incorporated by reference.

It has long been known that the semiconductor titania (titanium dioxide, $TiO_2$) is also a photocatalyst that has been shown to be useful in a wide variety of photocatalytic applications, including but not limited to, generation of hydrogen from aqueous media, and disinfection and detoxification of gases, liquids, and surfaces. Ultraviolet illumination of titania produces positive charges, or holes, and negative charges that dissociate water molecules provided by even ambient humidity in air into hydroxy ions ($OH^-$) that are adsorbed on the titania, and hydrogen ions. Hydroxyl radicals ($OH^·$) are then formed when the hole accepts an electron from the adsorbed hydroxy ion. These highly reactive $OH^·$ radicals are powerful oxidizing agents, second only to fluorine and many times stronger than concentrated bleach. Hydrogen peroxide ($H_2O_2$) and oxygen radicals ($O_2^-$), also powerful oxidizers, are also formed. These agents have been shown to act together or separately to dissociate many organic molecules and other pollutants into harmless compounds, such that they can be used to remove contaminants from air and water, killing even drug-resistant bacteria and viruses on surfaces or in air and water, and reducing $NO_x$ and other pollutants in air. As a result, titania photocatalysts are found now in commercial applications ranging from self-cleaning films on windows to self-cleaning buildings built from titania-containing concrete to indoor air and surface disinfection when combined with artificial ultraviolet light sources.

For general background information relating to titania as well as carbon and nitrogen doped titania photocatalysts, including its uses and synthesis methods see:
1. M. R. Hoffmann, S. T. Martin, W. Choi, D. W. Bahnemann, "Environmental Applications of Semiconductor Photocatalysis," Chem. Rev. 95, 69 (1995).
2. U. Diebold, "The Surface Science of Titanium Dioxide," Surface Science Reports 48, 53 (2003).
3. J. Ryu, W. Choi, "Substrate-Specific Photocatalytic Activities of $TiO_2$ and Multiactivity Test for Water Treatment Application," Environ. Sci. Technol. 42, 294 (2008).
4. W. A. Jacoby, P. C. Maness, E. J. Wolfrum, D. M. Blake, J. A. Fennell, "Mineralization of Bacterial Cell Mass on a Photocatalytic Surface in Air," Environ. Sci. Tech. 32, 2650 (1998).
5. O. Legrini, E. Oliveros, A. M. Braun, "Photochemical Processes for Water Treatment," Chem. Rev. 93, 671 (1993).
6. A. Fujishima and K. Honda, Nature, 238, 37 (1972).
7. C. D. Valentin, G. Pacchioni, A. Selloni, "Theory of Carbon Doping of Titanium Dioxide," Chem. Mater. 17, 6656 (2005).
8. Y. Choi, T. Umebayashi, S. Yamamoto, S. Tanaka, "Fabrication of $TiO_2$ Photocatalysts by Oxidative Annealing of TiC," J. Mater. Sci. Lett. 22, 1209 (2003).
9. Y. Choi, T. Umebayashi, M. Yoshikawa, "Farication and Characterization of C-doped Anatase $TiO_2$ Photocatalysts," J. Mater. Sci. 39, 1837 (2004).
10. P. Górska, A. Zaleska, E. Kowalska, T. Klimczuk, J. W. Sobczak, E. Skwarek, W. Janusz, J. Hupka, "$TiO_2$ Photocatalytic in Vis and UV Light: The Influence of Calcination Temperature and Surface Properties," App. Catal. B: Env. 84, 440 (2008).
11. T. Tachikawa, S. Tojo, K. Kawai, M. Endo, M. Fujitsuka, T. Ohno, K. Nishijima, Z. Miyamoto, T. Majima, "Photocatalytic Oxidation Reactivity of Holes in the Sulfer- and Carbon-Doped $TiO_2$ Powders Studied by Time-Resolved Diffuse Reflectance Spectroscopy," J. Phys. Chem. B 108, 19299 (2004).
12. T. Morikawa, R. Asahi, T. Ohwaki, K. Aoki, Y. Taga, "Band-Gap Narrowing of Titanium Dioxide by Nitrogen Doping," Jpn. J. Appl. Phys 40, L561 (2001).
13. L. Wan, J. F. Li, J. Y. Feng, W. Sun, Z. Q. Mao, "Improved Optical Response and Photocatalysis for N-Doped Titanium Oxide ($TiO_2$) Films Prepared by Oxidation of TiN," Appl. Surf. Sci. 253, 4764 (2007).
14. J. Wang et al., "Origin of Photocatalytic Activity of Nitrogen-Doped $TiO_2$ Nanobelts," J. Am. Chem. Soc. 131, 12290 (2009).

However, titania photocatalyst powders in their present state have not lived up to their enormous potential because they do not use visible light efficiently or at all. The band gap of titania, whether in its anatase or its rutile form, exceeds 3.0 eV, so that it only absorbs in the ultra-violet portion of the electromagnetic spectrum. Because there is very little ultra-violet light present in sunlight at the surface of the earth (sunlight integrated over the 3 eV to 4 eV range is less than 6 mW per square cm, compared to the 100 mW per square cm total in visible sunlight) and even less or no ultraviolet light indoors, commercially available titania photocatalysts have limited effectiveness in sunlight, and for indoor use they require artificial ultraviolet light sources to work. The latter must be shielded from skin and eyes, create ozone pollution, and are expensive to operate because of their inefficient conversion of electricity to ultraviolet light.

Given the important uses of titania and the poor photocatalytic efficiency of titania in the absence of ultraviolet light, much effort has been devoted to reducing the band gap of titania in order to improve its photochemical efficiency. For example, U.S. Pat. No. 7,628,928 describes a method in which a stressed titania film is formed on a spherical substrate having a sufficiently small radius to cause stress in the titania film and thereby shift its band gap to support photocatalytic detoxification and disinfection in visible light. Similarly, U.S Published Application No. 2008/0299697 describes a process for producing a titania electrode comprising anatase having a bandgap lower than that of unstressed anatase. This process comprises subjecting titanium metal to an etchant, and then oxidizing at least part of the etched titanium to anatase by anodizing the titanium in an anodizing solution, and/or heating the titanium in an oxygen-containing atmosphere.

Another approach to reducing the band gap of titania is by doping, that is to say by introducing atoms of other elements into the titania crystals. For example, U.S. Pat. Nos. 7,096, 692 and 7,749,621 describe a visible light photoactive coating produced by doping titania with one of more of the metals chromium, vanadium, manganese, copper, iron, magnesium, scandium, yttrium, niobium, molybdenum, ruthenium, tungsten, silver, lead, nickel and rhenium. U.S. Pat. Nos. 7,637, 858 and 7,651,675 describe a process of producing a nitrogen-doped titanium oxide for a photocatalyst having light absorption in the visible light region. The doped titanium oxide is prepared by preparing a titania/organic substance composite including an organic ligand coordinated to flaky titania and forming a layered structure; immersing this titania/organic substance composite in aqueous ammonia; drying the resulting composite; and, after the drying step, heating the composite at a temperature of 400 to 500° C., whereby nitrogen is doped into titania by thermal decomposition of the ammonium and, in addition, titania is crystallized to an anatase form. U.S. Pat. No. 7,141,125 describes a peroxo-modified titania intended for use in photocatalysis. U.S. Pat. No. 5,242,880 describes anatase titania provided with sodium, potassium, calcium, magnesium, barium, zinc, or magnesium salts of sulfuric or phosphoric acid, and stated to be useful in the pigmentation of oxidizable polymers. U.S. Pat. No. 6,703, 438 describes an electroconductive plate-like titania containing at least 10% by weight of titanium nitride and at least 0.1% by weight of carbon, which is claimed to provide electroconductive parts which are higher and more uniform in electroconductivity. Finally, U.S. Published Application No. 2010/0062928 describes a method for producing titania doped with carbon atoms and nitrogen atoms (and optionally metal atoms). This doped titania is produced by dispersing or dissolving a basic polymer having amino groups in aqueous medium; obtaining a layered structure composite of polymer/titania with the basic polymer inserted among titania by mixing the aqueous dispersion or solution and a water-soluble titanium compound in an aqueous medium, and producing a hydrolytic reaction at a temperature of 50° C. or less; and burning with heat the layered structure composite.

Multiple publications report the synthesis of nitrogen and carbon-doped titania claiming enhanced and visible light photocatalytic activity. Methods include the low temperature (350-750° C.) calcination of titania precipitates from sol-gel processes both with and without additional carbon or nitrogen containing precursors. A single step low temperature calcination (400° C.) of titania powder mixed with carbon containing chemicals such as urea and thiourea have also been reported to dope titania with carbonate species. The oxidation of titanium carbide powder has been studied over a range of temperatures (350-800° C.) and has shown a modest enhancement due to carbon doping when oxidized at the lower end of this temperature range. Similar work has been performed studying the oxidation of TiN powders and films with reports of nitrogen doping percentages typically close to 0.1%. These published results achieve only modest increases in visible light photocatalytic activity or even report substantial reductions in overall photocatalytic activity as a result of the carbon or nitrogen doping.

It has now been found that a carbon and/or nitrogen-doped titania having high photocatalytic activity in visible light can be produced by a simple two-step process starting from commercial grades of titania and carbon powders and nitrogen gas, and the present invention relates to this process, to the doped titania thus obtained, and to processes for use of this doped titania.

SUMMARY OF THE INVENTION

In one aspect, this invention provides a process for preparing a titania having high visible light photochemical activity. This process comprises:
 (a) mixing titania powder with carbon powder;
 (b) heating the titania/carbon powder mixture to at least about 1000° C. in an inert or weakly reactive atmosphere; and
 (c) thereafter heating the resultant powder mixture to a temperature in the range of about 350 to about 1000° C. in an oxidizing atmosphere.

In this process, the starting titania and carbon powder can be any reasonably pure commercial grades of the materials but should preferably be in finely divided form. For example, good results having been obtained using anatase titania nanopowder APS 10-50 nm size, 99.99 percent pure, or rutile titania nanopowder APS 20 nm size, 99.99 percent pure, both available from MTI (MTI Corporation, 860 South 19$^{th}$ St., Richmond, Calif. 94804). Similarly, good results have been obtained using carbon (graphite) nanopowder APS<30 nm size, 99.9 percent pure from the same supplier, or J. T. Baker active carbon powder (Mallinckrodt Baker, Inc., Phillipsburg, N.J. 08865), although this carbon appears to produce a product having a lower visible absorption. Additional candidate carbon nanopowders include, but are not limited to Colour Black FW 171 APS=11 nm from Evonik (Evonik Industries AG, Rellinghauser St. 1-11, 45128 Essen, Germany), the Raven line of carbon blacks available through Columbian (Columbian Chemicals Company, 1800 W. Oak Commons Crt., Marietta, Ga. 30062), and carbon lamp black APS 13-95 nm 99.6% purity available from Reade Advanced Materials (850 Waterman Ave., Providence, R.I. 02915). Generally the process can be modified within certain bounds to optimize the visible light absorption and photocatalytic activity with respect to the average particle sizes of the titania and carbon starting powders. The minimum weight ratio of carbon to titania is critical to the quality of the final product and the carbon should exceed 40% for the best results. Visible light absorption can be achieved with large variance of the titania to carbon ratio, however, a change in the scattering factor suggests that the average particle size of the resultant powder is affected. The carbon powder therefore serves as the source of the carbon dopant and also limits the extent of the sintering of the titania powder so that average particle size and active surface area of the final powder are not greatly impacted. Smaller average particle size carbon nanopowders are preferred to limit the sintering of the titania powder. Nitrogen gas serves as the nitrogen dopant source in the process. However, both the carbon and nitrogen dopants may be derived from almost any gas or powdered solid phases of carbon or nitrogen containing compounds such as titanium carbide, titanium nitride, urea, thiourea, isopropyl alcohol, ammonia, amines, etc.

In step (b) of the process, the titania/carbon powder mixture is heated to a temperature of at least about 1000° C. (and preferably 1000 to 1500° C.) in an inert or weakly reactive atmosphere. This step may be carried out in an atmosphere of inert gas, or in an atmosphere comprising inert gas with a minor proportion of oxygen and/or nitrogen. The final powder properties including the nitrogen and carbon doping percentages are largely influenced by the three interdependent variables of atmosphere reactivity, set temperature magnitude and holding time of this processing step. The specific atmosphere at this stage is critical to the types of absorption bands present in the final product. End products in which this step (b) is carried out in a fully inert argon atmosphere show strong absorptions in the ultraviolet (typical for titania) and a broad peak centered in the near-infrared as well as a constant absorption throughout the entire range of the visible spectrum. In this case the additional absorption atypical of pure titania may be primarily attributed to carbon doping of the titania. However, any residual graphite present may be partly responsible for the constant absorption offset. End products in which step (b) is carried out in a weakly reactive argon based atmosphere with nitrogen, oxygen, or air bleeds show these same absorptions with an additional strong absorption band in the visible spectrum within the range of about 345-550 nm. This absorption band is strongest when step (b) is carried out with either pure nitrogen or air bleeds and is largely attributable to additionally doping the titania with nitrogen. To a lesser extent this absorption band also appears when step (b) is carried out using a pure oxygen bleed, indicating that the carbon dopant may also contribute to this absorption band. A pure oxygen bleed results in the highest photocatalytic degradation rates and largest near-IR absorption, but processing in a too strongly oxidizing atmosphere generally results in a titania product with no remarkable absorption characteristics and nullifies the goal of the process as a whole. Temperatures in the range of about 1000 to 1500° C. have been verified to yield useful products that demonstrate visible light absorption due to both carbon and nitrogen doping. The optimum reactive gas bleed rate is dependent upon the set temperature of this step (b) process. For example, a set temperature of 1330° C. requires an atmosphere containing between about 0.2-0.9% air by volumetric flow to produce powders demonstrating visible light absorption, whereas a set temperature of 1400° C. can tolerate only between about 0.2-0.5% air before the atmosphere is too strongly oxidizing. The holding time (the time the sample is held at the set temperature not including ramp up and cool down times) in this step is dependent on both the temperature and reactivity of the atmosphere. Higher temperatures and/or more reactive atmospheres decrease the required holding time leading to preferred temperatures ranging from about 1200 to about 1400° C. Temperatures greater than 1400° C. prefer short (less than 1 hour) holding times that become practically limited by the safe loading temperature and ramp rate of the furnace. The final nitrogen doping percentage of the titania exhibits strong time dependence and drops to insignificant levels for prolonged holding times in any nitrogen containing atmosphere. At a set temperature of 1330° C. holding times greater than about 45 minutes resulted in negligible nitrogen doping percentages when using either pure nitrogen or air bleeds. Carbon doping percentages have differing time dependencies based on the specific atmosphere. Holding times for pure argon atmospheres must be short, less than about 45 minutes at 1330° C., to prevent the formation of titanium carbide and subsequently low carbon doping percentages. However, in weakly oxidizing atmospheres the carbon doping percentages appear to rise suddenly and then asymptotically approach a limiting value. For example, at 1330° C. (air bleed between about 0.2-0.9%) holding times of 20 and 40 minutes resulted in carbon doping atomic percentages of 3.87% and 4.26% respectively, but negligible doping for a 15 minute holding time. The photocatalytic efficiency of the final powders also rises rapidly after about 20 minutes holding time. Holding times at this temperature in excess of 45 minutes only marginally improves the photocatalytic efficiency of the final powder, but prolonged holding time or excessive temperature results in agglomeration of the graphite into larger particles that become more difficult to separate from the final product. In the specific Examples given below, the titania/carbon powder mixture is loaded into the furnace between 800-1000° C. and the furnace is then ramped up to a temperature of 1330° C. at a rate of about 7° C. per minute. The ramp rate and loading temperature, however, are chosen to reduce thermal shock in the specific apparatus used, and it is not believed that either are critical parameters.

Following step (b), the resultant powder mixture is allowed to cool to below about 300° C. before being introduced to ambient air atmosphere; if removed at a higher temperature, the powder may spontaneously ignite. It is generally advantageous to regrind the mixture at this point to ensure proper conversion in the next step. In step (c), the resultant powder mixture from step (b) is again heated, but this time to a temperature in the range of about 350 to about 1000° C. in a strongly oxidizing atmosphere; essentially pure oxygen is preferred although air may be used. A wide variance of set temperatures in this step will produce carbon and/or nitrogen-doped titania with a visible response. It has been demonstrated that the initial compounds at the start of this step are not reactive enough to oxidize below a set temperature of 350° C., nor will the residual graphite react to be vented as carbon monoxide or dioxide gas. Temperatures above 1000° C. produce powders with negligible visible response for any reaction time. The optimum holding time in this step is a function of the set temperature and ranges from 15 minutes for T≥700° C. to more than 100 hours for T=350° C. For the generally preferred set temperature of 435° C. the optimum holding time ranges from 19-23 hours, with the variance due to a weak coupling to the step (b) process parameters. The heating is stopped once the residual graphite carbon has been vented as carbon monoxide or dioxide gas and the desired chemical properties of the carbon and/or nitrogen-doped titania have been achieved. Within the 350-1000° C. temperature range in this step, unlike the first step, the visible absorption response characteristic of the nitrogen dopant appears to be very stable with time, particularly when the oxidation is carried out at the lower end of the temperature range. The near IR and constant visible absorption response characteristic of the carbon dopant reduces with oxidation time at all temperatures leading to lower preferred temperatures and minimum tolerable oxidation time. The optimum set temperature is also determined by the desired anatase to rutile ratio of the doped titania. The anatase to rutile titania ratio always decreases with increasing set temperature resulting in generally decreased photocatalytic efficiency. Use of temperatures below 435° C. produces carbon and/or nitrogen-doped titania with a significant amount of anatase phase present that is generally most effective in the photodegradation of various compounds. Thus, temperatures towards the lower end of the possible 350-1000° C. range are preferred for step (c).

Figure 4A:
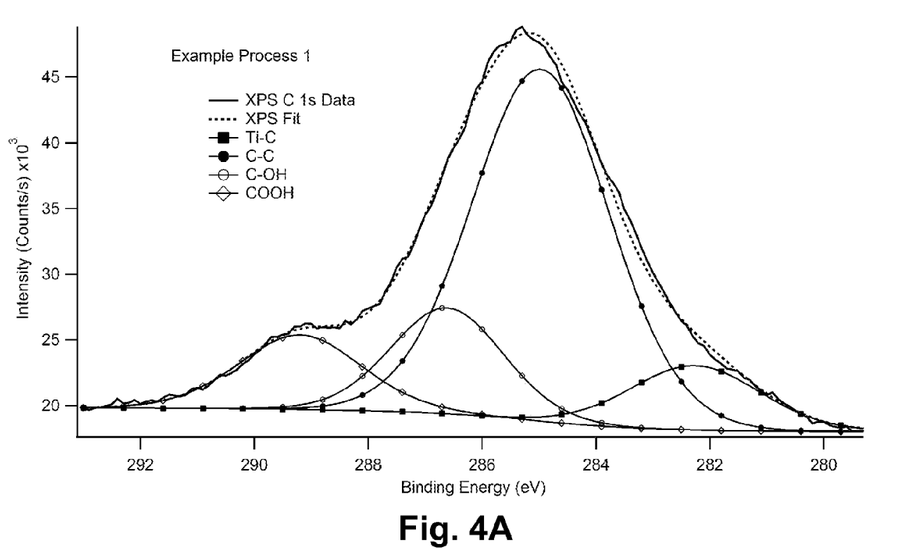
Figure 4B:
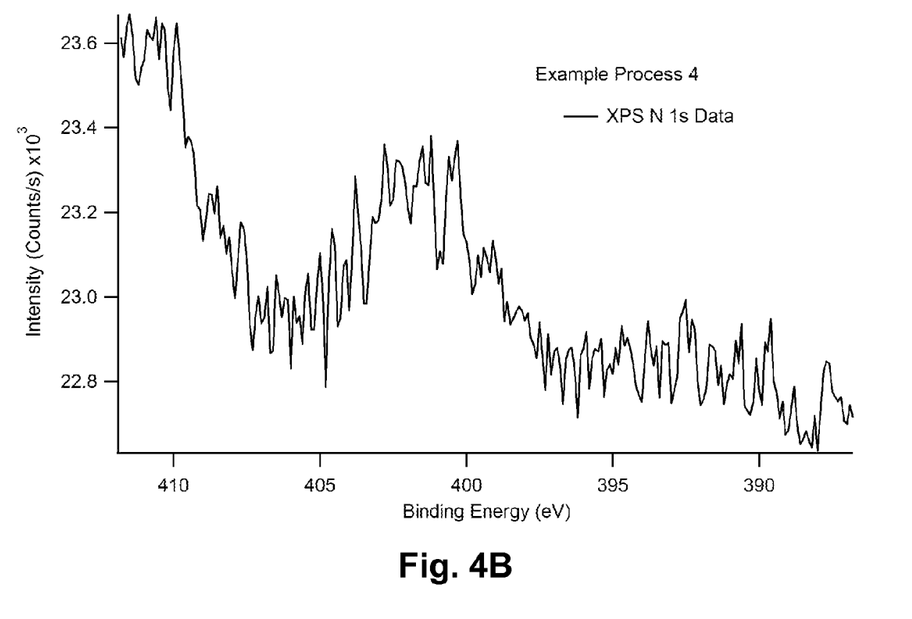
FIG. 4B shows the X-ray photoelectron spectrum (binding energy range appropriate for detection of nitrogen 1s) of a visible light titania sample of the present invention.

This invention also provides a carbon and/or nitrogen-doped titania having an XPS spectrum substantially as shown in FIG. 4A or 4B of the accompanying drawings.

This invention also provides a titania photoactive in visible light (hereinafter for convenience abbreviated "visible light titania") and showing at least about 3 percent Ti—C bonding by XPS. Nitrogen doping percentages as high as 0.32 atomic percent have been detected by XPS in an interstitial bonding configuration.

The visible light titania of the present invention may be used in any of the applications in which other photoactive forms of titania have hitherto been used. Without prejudice to the generality of the foregoing statement, the visible light titania of the present invention may be used in any of the applications described in the aforementioned U.S. Pat. No. 7,628,928 and U.S. Published Application No. 2008/0299697. For example, the visible light titania may be used to detoxify or disinfect a medium such as air or water in contact with or proximal to it while illuminating the titania with visible or near infra-red radiation (a term which is used herein to refer to radiation from the long wavelength end of the visible spectrum to about 1300 nm.). When the material to be detoxified or disinfected is a liquid, the titania may be added to the liquid as a powder prior to the illumination. When the material to be detoxified or disinfected is a solid substrate and/or gas adjacent to such a substrate, the titania may be coated on to or incorporated into the solid substrate. The visible light titania may also be used for point-of-use dissociation of an aqueous medium into at least hydrogen gas along with other products that depend on the aqueous medium. However, this application requires an additional step of either adding a smaller particle of preferably a noble metal such as platinum to each visible light titania particle in order to keep the photo-generated charges separated, or adding methanol (or a similar material) to the aqueous medium as a sacrificial electron donor.

The process of the invention normally produces the visible light titania in a fine powder form. This form of the titania is well adapted for certain applications; for example, when the titania is to be used for detoxification of wastewater, the titania powder may simply be added to the liquid to be detoxified and the resultant mixture exposed to appropriate radiation. This application can take many forms, including but not limited to placing the mixture in a container that is transparent to the full solar spectrum and then placing that container either directly in the sunlight or at the focus of an optical concentrator. The processing of the mixture can be of the batch type, i.e. the mixture is held until completely detoxified and/or disinfected and then released, or in a flow, or a combination of the two. The visible light titania is reclaimed by either filtration or simply by allowing it to settle out of the liquid over time. Alternatively, it can be bound to a flat or cylindrical or other surface over which the liquid is flowed while illuminated. For air and surface disinfection and detoxification, the visible light titania powder can be adhered to surfaces such as fibers in air filters for buildings or face masks, fabric for protective clothing, sheet paper, and envelopes. It can similarly be adhered to the interior of air-carrying ducts such that, when the interior is also illuminated with light, the ducts are self-sanitizing. The visible light titania can similarly be bound into or onto concrete, plaster, stucco, paint, ceramic, ceramic glaze, floor surfaces, wallpaper, and other interior and exterior surfaces in kitchens (especially food-handling surfaces such as countertops and cutting boards), hospitals, bathrooms (including fixtures such as sinks, toilets, bathtubs), automotive (and also marine and aeronautical) surfaces including cabin interiors, exterior paint finish, headlights, and windows, or any surfaces that are frequently touched by people such as keypads and screens on personal digital devices, or shopping cart handles. So-called self-cleaning building exteriors would incorporate the visible light titania not only into or onto their polymer, glass or concrete surfaces, but also onto their aluminum, stainless steel, copper, or other metallic exterior coverings. The visible light titania powder can be applied to such surfaces by several means, including but not limited to: electrostatic powder deposition, sol gel deposition, inkjet printing, pressure bonding, adhesion bonding, mixing with binders and then spray painting, mixing with concrete and then applying or casting, mixing with plastic resins and then molding, casting, or extruding into sheets, fibers, or other forms. While some of the aforementioned applications exist for "normal" titania powder activated only by ultraviolet, the interior applications require separate ultraviolet illumination that add both capital and operation costs. And because it is harmful to people, the UV illumination forces expensive downtime. The visible light titania powder that is the subject of this invention would operate with visible light, requiring no downtime or separate UV illumination sources. Similarly for building exteriors, the small amount of ultraviolet present in sunlight (less than 5%) makes our visible light titania powder much more effective for not only self-cleaning but also for cleaning contacted air of nitrous oxides and other pollutants.

This invention extends to a sunscreen or protective sunglasses comprising a nitrogen-doped titania of the invention.

Other features of the invention will be readily apparent when the following detailed description is read in connection with the drawings.

BRIEF DESCRIPTION OF THE DRAWINGS

FIG. 4A shows the X-ray photoelectron spectrum (binding energy range appropriate for detection of carbon 1s) of a visible light titania sample of the present invention as obtained in the experiments described in Example 7 below, while

DETAILED DESCRIPTION

As already mentioned, in one aspect this invention provides a process for preparing a visible light titania having high photocatalytic efficiency. This process comprises mixing titania with carbon powder; heating the titania/carbon powder mixture to at least about 1000° C. in an inert or weakly reactive atmosphere; and thereafter heating the resultant powder mixture to a temperature in the range of about 350 to about 1000° C. in an oxidizing atmosphere. The product of this process is a carbon and/or nitrogen-doped visible light titania. This material, when illuminated with a light source simulating solar radiation, demonstrates greatly enhanced degradation of both methylene blue and rhodamine B dyes (recognized tests for photoactivity) as compared with literature reports of carbon or nitrogen-doped titania produced by other synthesis methods, or as compared with an unmodified industry standard titania such as Aeroxide P25 (a nanopowder titania sold by Evonik Degussa Corporation, 379 Interpace Parkway, Parsippany, N.J. 07054). The doped titania of the present invention has also been demonstrated to photodegrade methylene blue using visible light only (wavelengths longer than 400 nm and 450 nm), a property not shared by unmodified titania. The process of the present invention is also capable of tailoring the ratio of the anatase to rutile titania polymorphs to suit the needs of a given application.

The process of the present invention to synthesize carbon and/or nitrogen-doped titania consists of two main steps. The first step uses a (preferably homogeneous) mixture of pure titania powder with carbon powder. The mixture is heated to a high temperature in an inert (argon) or weakly reactive atmosphere that is conveniently achieved in a tube furnace with a constant argon purge coupled with air, nitrogen, and/or oxygen gas bleeds. By the end of this step the powder consists of residual unmodified carbon and an intermediate $TiO_xC_yN_z$ compound. The second step is an oxidative anneal of the powder produced in the first step. This second step is carried out at a lower temperature than the first step and requires an atmosphere of oxygen, or oxygen mixed with inert gas such as nitrogen or argon. If the processing temperature used in this step is above the auto-ignition temperature of either the $TiO_x$-$C_yN_z$ compound or carbon, the inert gas may be used to dilute the oxygen to prevent ignition of the powder and production of an unpredictably higher temperature. During this second step, oxygen reacts with the residual carbon to form carbon monoxide or dioxide gas that is vented from the process tube. More importantly, the $TiO_xC_yN_z$ compound is oxidized to form a carbon and/or nitrogen-doped titania ($TiO_{2-a}C_bN_c$) compound. The processing temperature in the second step is primarily responsible for controlling the ratio of titania crystal polymorphs, anatase and rutile, in the final product.

Characterization of the product of the present process has been accomplished using a number of techniques, including scanning electron microscopy (SEM). Elemental identification and rough quantification has been measured using Energy-Dispersive X-ray Spectroscopy (EDX). The ultraviolet, visible and near-infrared absorption has been measured with a spectrophotometer coupled with an integrating sphere and post-processed using the Kubelka-Munk function appropriate for highly scattering, infinitely thick materials. These absorption spectra have confirmed the presence of visible light absorption over the entire range of wavelengths measured including a strong resonant peak in the ranges of about 345-550 nm and a broad peak covering the entire visible and near infrared range measured. As set out in the Examples below, the photocatalytic activity of the product has been quantified by its ability to break down methylene blue dye dissolved in distilled water when illuminated with a solar simulator light source. Significant visible light photocatalytic activity has been confirmed by filtering out the UV portion of the light source with both 400 nm and 450 nm long pass filters. Other photocatalytic activity tests include measurements of the degradation rates of aqueous solutions of both rhodium B dye and phenol. Select samples have been analyzed to confirm and identify the nature of the carbon and nitrogen doping using X-ray Photoelectron Spectroscopy (XPS). X-ray Diffraction (XRD) data has also been obtained for a highly photocatalytically active sample (the product of Example 1 below) and this XRD data verifies that only anatase and rutile titania polymorphs are present.

The following Examples are now given, though by way of illustration only, to show details of particularly preferred reagents, conditions and techniques used in the process of the present invention, and the properties of the products obtained from this process. It will be clear to those skilled in the art that while some of the steps are described in terms of small volume production such as in a laboratory, all steps and processes in the Examples are scalable within the parameters taught to large-production manufacturing and will result in the same end products.

Example 1

First Preferred Synthesis of Carbon and Nitrogen-Doped Titania

Anatase titania powder (MTI APS nanopowder, 10-50 nm, purity 99.99%) and carbon powder (MTI synthetic graphite APS nanopowder, <30 nm, purity 99.9%) were weighed out at a weight ratio of 53:47 titania:carbon. The powders were mixed and ground together using a mortar and pestle until a homogeneous mixture was achieved. An aliquot (0.5 g) of the resulting mixture was loaded into an alumina combustion boat, which was placed in a tube furnace maintained at 1000° C. and purged with inert gas (argon grade 5.0, 1000 cubic centimeter per minute (ccm)) and air bleed maintained between 2-5 ccm. The temperature of the tube furnace was then ramped up to 1330° C. at a rate of 7.162° C./min. The furnace was then held constant at 1330° C. for 40 minutes. The furnace was then shut down and allowed to cool.

Once the furnace has cooled below 300° C. the powder was removed; removing the powder at a higher temperature may result in auto-ignition of the powder upon contact with ambient air. The powder was remixed with the mortar and pestle, and 0.1 g of the powder was weighed out and loaded into a quartz combustion boat. The boat was loaded into a tube furnace maintained at 435° C. and purged with oxygen (grade 2.6, 0.2 standard cubic feet per hour (scfh)). The powder was left in the furnace at this temperature for 21 hours, with occasional stirring. Finally, the powder was removed from the furnace and allowed to cool (samples designated for XPS analysis were stored in a desiccator).

Example 2

First Preferred Synthesis of Carbon-Doped Titania

The powder was prepared for thermal treatment in accordance with the first step of Example 1 above. The powder was loaded into the argon purged tube furnace maintained at 800° C. The furnace temperature was then ramped at a rate of 7.162° C./min. After the furnace reached 1000° C., a pure oxygen bleed of 3.07 ccm was introduced for the remainder of this step. The furnace temperature was ramped to 1330° C. and held for 45 minutes before being shut off and allowed to cool. The second step of the process was conducted in a similar manner to that of Example 1, except that the tube furnace was maintained at 435° C. for 19 hours.

Example 3

Second Preferred Synthesis of Carbon and Nitrogen-Doped Titania

The powder was prepared for thermal treatment in accordance with the first step of Example 1 above except that the weight ratios of the powders were 40:60 anatase titania:carbon. The first thermal processing step of Example 2 above was repeated, except the bleed gases introduced at 1000° C. were 3.07 ccm of oxygen and 2.54 ccm of nitrogen. The second step of the process was conducted in the same manner to that of Example 2 except the temperature was maintained at 435° C. for 23 hours.

Example 4

Third Preferred Synthesis of Carbon and Nitrogen-Doped Titania

The first step of Example 2 above was repeated, except that the powder was held at 1330° C. for only 15 minutes and the bleed gas introduced at 1000° C. was 7.44 ccm of nitrogen. The second step of the process was also conducted in a similar manner to that of Example 2, except that the tube furnace was maintained at 435° C. for 23 hours.

The preferred processes of the present invention in Examples 1-4 above are very similar but yield final powders with differing physical, optical, and chemical properties. Examples 1-3 yield a less than optimum absorption coefficient in the visible part (390-550 nm) of the spectrum, but a high anatase to rutile ratio and high carbon doping percentages; such properties are desirable for applications requiring high photocatalytic activity, as for the methylene blue degradation described below, and more generally for water and air purification. Example 2 above demonstrates the maximum achieved photocatalytic degradation rate and uses no nitrogen in the process. Example 3 is nearly identical to Example 2 except for the addition of a small amount of nitrogen. The photocatalytic degradation rate of Example 3 is slightly less than that of Example 2; however, the degradation at low dye concentration is better for Example 3, indicating that the carbon and nitrogen doped powders have a higher adsorption rate than powders doped with only carbon. Example 4 yields a powder that has a high interstitial nitrogen doping percentage but a very low carbon doping percentage, and has been observed to be a less effective photocatalyst; however, the Example 4 powder has the maximum achieved absorption coefficient in the visible light spectral range of 390-550 nm. Maximizing visible light absorption (without regard to photocatalytic activity) is desirable for applications requiring blocking not only of the damaging ultraviolet in sunlight or other light sources, but also of the damaging high energy deep blue visible light. For example, titania is currently employed in sunscreen lotion to absorb the ultraviolet, but additionally zinc oxide and organic compounds are added to further absorb the ultraviolet as well as damaging deep blue light. There has been concern in the literature that the organic compounds may break down into possibly carcinogenic chemicals. The visible light titania absorber produced by this example would potentially replace these volatile organic compounds. Additional applications include but are not limited to mixing the visible light absorbing titania powder to plastics, fabrics, paints, glass, or any other material for which it is desired to block the ultraviolet and high energy blue light more completely without forming byproducts.

Example 5

Ultraviolet/Visible and Near-Infrared Spectroscopic Data

Figure 1:
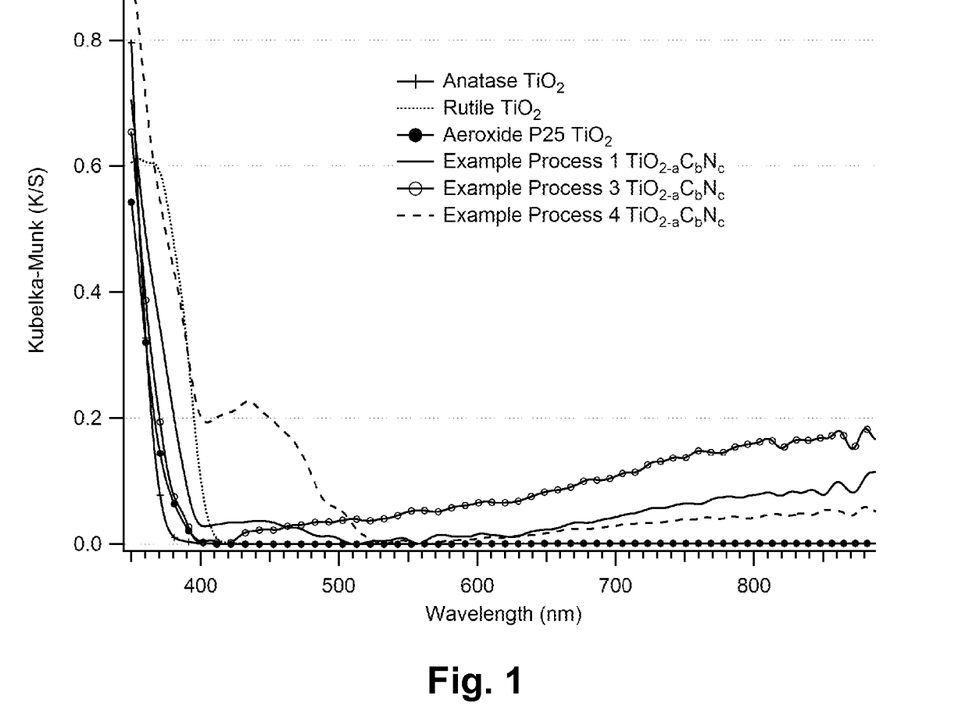
FIG. 1 is a graph showing the absorption of various visible light titania samples of the present invention, and of control samples, as a function of wavelength, as obtained in the experiments described in Example 5 below.

The ultraviolet, visible, and near-infrared absorption spectra of the carbon and/or nitrogen-doped titania powders produced in Examples 1-4 above were measured using an Ocean Optics USB4000 spectrophotometer. To provide controls, similar spectra were used using the same instrument for pure anatase and rutile forms of titania, and for the aforementioned Aeroxide P25 titania nanopowder. The reflectance values obtained were converted to absorption/scatter (K/S) by the corresponding Kubelka-Munk functions, and the results are shown in FIG. 1 of the accompanying drawings. Any constant offset in K/S is subtracted out so that the minimum K/S for each sample is zero. Although the constant offset may be of physical significance to the optical properties of the powder, residual graphite also contributes and interferes with quantitative interpretation of the offset.

More specifically, the absorption spectroscopy measurements were performed in accordance with the constraints required to fulfill the assumptions of Kubelka-Munk analysis for infinitely thick, highly scattering media. These constraints are that the reflectance of the material is collected by an integrating sphere, the material is embedded in a transparent, scattering host, the particle size is small enough to ensure a constant scattering coefficient, and the sample thickness is sufficient for zero transmission. When these assumptions are met, the Kubelka-Munk function relates a diffuse reflectance spectrum to absorption (divided by constant scattering coefficient) according to the following Equation:

$$K/S = \frac{(1-R)^2}{2R} \qquad (1)$$

A diffuse reflectance spectrum was measured by loading a sample into an aluminum sample cup and inserting it flush with the sample port of the integrating sphere (IS). The electrical dark and stray light noise was subtracted out by baffling the IS input port and collecting the spectrum with the light on. Magnesium fluoride hydrate was chosen as the reference spectrum and transparent host material. The powder to be measured was diluted to a 3% by weight ratio and ground together with the magnesium fluoride. The diffuse reflectance was measured for the diluted sample and the ratio of this spectrum to the reference spectrum is the parameter R in Equation 1. UV/Vis spectra were measured with a xenon light source with a strobe rate of 10 ms and a 12 second integration of the reflectance signal. Near-IR spectra were measured with an unstrobed tungsten halogen source and a 7 second integration of the reflectance signal.

FIG. 1 illustrates the ranges of the UV-visible and near-IR spectrum where the powders are absorbing and/or scattering versus those where the powders are transparent. Process parameters that result in absorption of visible light can then easily be bounded and optimized for maximum absorption. The UV absorption behavior can also be examined to qualitatively identify the ratio of anatase to rutile titania polymorphs. Additionally, absorption in the deep visible has been correlated to nitrogen doping while the broad band centered in the near infrared is attributable to carbon doping.

FIG. 1 shows that the carbon and nitrogen-doped titania powders of the present invention exhibit significant absorption in the visible part of the spectrum at wavelengths shorter than approximately 550 nm as well as a broader absorption band centered in the near-IR extending through the entire visible spectrum. Undoped rutile and anatase titania absorb only at wavelengths shorter than 414 nm and 388 nm respectively. The industry standard Aeroxide P25 powder appears to be a very high ratio anatase to rutile mixture. XRD results verify that the carbon and nitrogen-doped titania samples are a mixture of anatase and rutile phases, but with a lower anatase to rutile ratio than Aeroxide P25. The ratio of these phases in the carbon-doped titania of the invention is primarily determined by the processing temperature used in the second step; the product apparently becomes predominantly rutile at a processing temperature above 450° C. The color of the powder is a result of both the absorption band(s) introduced by the carbon and nitrogen dopants. Powders synthesized without the use of nitrogen appear gray due to the broad absorption extending over the entire visible range. Since the nitrogen dopant is more stable in high temperature oxidizing atmospheres, powders can be synthesized with high nitrogen doping percentages and little to no carbon doping percentages. These powders will appear yellow due to the strong absorption of blue light and transparency throughout the remaining part of the visible spectrum. If both absorptions are present, the powder appears green because its maximum reflectance occurs at about 550 nm, with the relative magnitudes of each dopant band on either side of 550 nm determining the exact shading observed.

Example 6

X-Ray Diffraction Data

Figure 2:
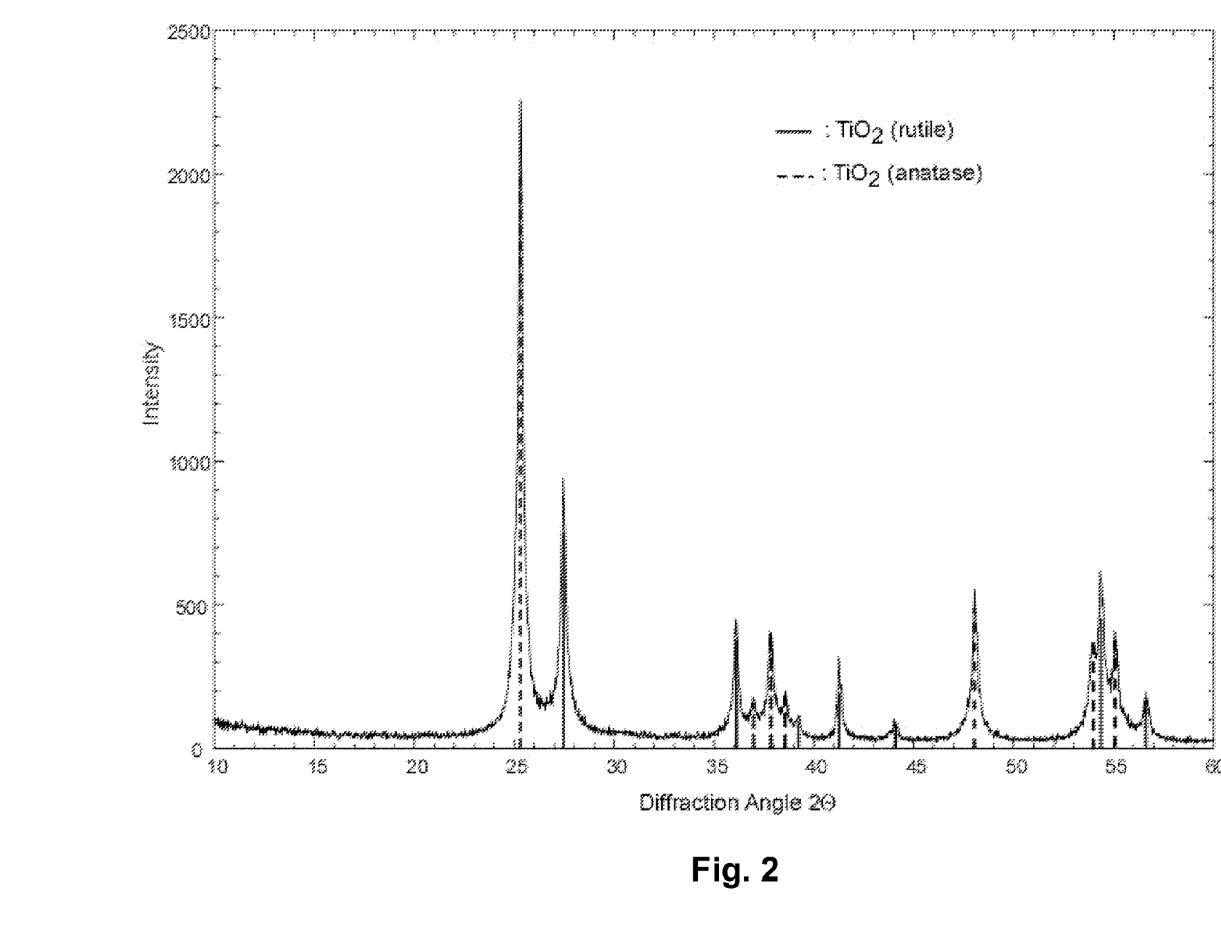
FIG. 2 shows the power X-ray diffraction spectrum of a visible light titania sample of the present invention, as obtained in the experiments described in Example 6 below.
Figure 3:
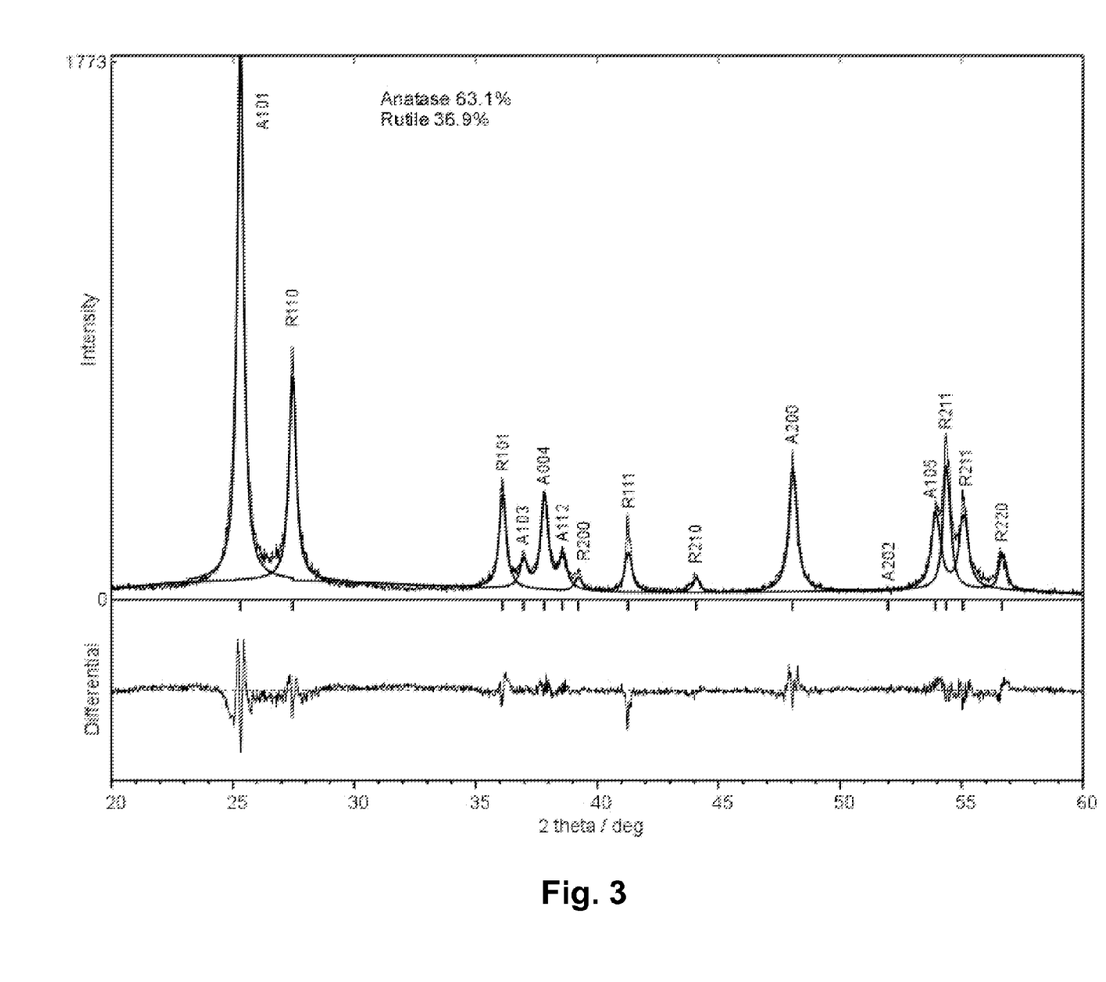
FIG. 3 shows an XRD peak fitting analysis used to determine the anatase to rutile ratio of the sample used to produce the spectrum of FIG. 2, as described in Example 6 below.

The carbon-doped titania powder produced in Example 1 above was subjected to powder X-ray diffraction using copper K$\alpha$ radiation, and the results are shown in FIG. 2 of the accompanying drawings. FIG. 3 shows an XRD peak fitting analysis used to determine the anatase to rutile ratio in the powder. The data in FIGS. 2 and 3 show that the powder is composed of only anatase and rutile titania polymorphs with an anatase to rutile ratio of 63.1:36.9. Since the processing temperature used in the first step of the present process is far above the stability conditions for anatase, and since the more stable rutile form cannot be converted into the anatase form, it may be concluded that a $TiO_xC_yN_z$ compound is formed during the first (high temperature) processing step. Because the $TiO_xC_yN_z$ compound is not a titania phase, the second, oxidative annealing, step of the present invention is able to produce a mixture of the anatase and rutile phases dependent primarily on the temperature used in this second step.

Example 7

X-Ray Photoelectron Spectroscopy Data

Figure 5:
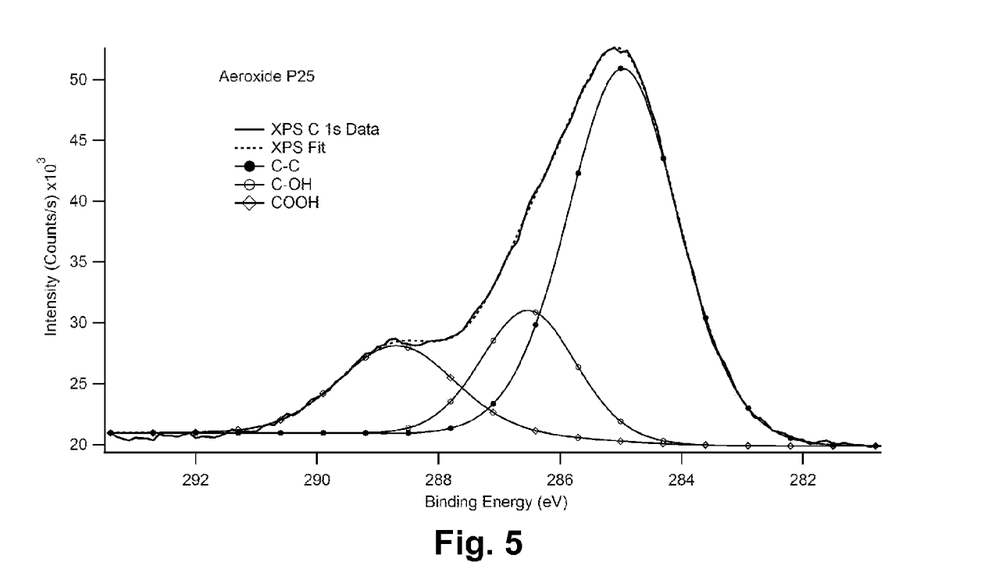
FIG. 5 is an X-ray photoelectron spectrum of the prior art Aeroxide P25 titania using the same conditions as those used for the spectrum shown in FIG. 4.

The carbon-doped titania powders produced in Example 1 and Example 4 above were subjected to X-ray photoelectron spectroscopy (XPS) and the resultant data are shown in FIGS. 4A and 4B. To provide a comparison, the aforementioned Aeroxide P25 was subjected to the same test, and its data are shown in FIG. 5.

As is well-known to those skilled in XPS, such data can provide elemental analysis, as well as identify the types of bonding present in a sample. However, the extreme surface sensitivity of the XPS technique makes precise quantitative measurements difficult due to surface contamination. FIG. 5 shows atomic percentage data for Aeroxide P25 powder as 17.8% Ti, 48.1% O, and 34.1% C; all the carbon present is shown to be contamination due to C—C, C—OH, C=O, and COOH bonding. FIG. 4 shows atomic percentage data for the carbon and nitrogen-doped titania powder produced in Example 1 above as 14.3% Ti, 45.8% O, and 39.9% C. Besides confirming that the carbon and nitrogen-doped titania powder of Examples 1 contains the same contaminant species as the Aeroxide P25 powder, the most notable result of the XPS data is the identification, in FIG. 4A, of Ti—C bonding (this being strong evidence of carbon doping), which is completely absent from the Aeroxide P25 titania in FIG. 5. More specifically, FIG. 4A indicates 10.7% of the 39.9% total carbon is present as Ti—C bonding in the product of Example 1, suggesting a doping percentage of 4.27%. The nitrogen doping percentages of the product of Example 4 were determined to be about 0.32 atomic percent. However, the XPS peak location, as shown in FIG. 4B, of about 401.7 eV is characteristic of interstitial doping rather than Ti—N bonding expected for substitutional doping. The product of Example 4 represents the maximum achieved nitrogen doping percentage and other products, such as that of Example 1, have lower nitrogen percentages and become difficult to detect using the XPS technique.

Example 8

Photocatalysis Data

The photocatalytic activity of the carbon and/or nitrogen-doped titania powders produced in Examples 1-4 above was studied by determining the time required for the powders to degrade methylene blue dye dissolved in distilled water; this is a recognized test for photocatalytic activity of titania. As in previous Examples, similar tests with Aeroxide P25 powder were performed as controls.

Methylene blue was diluted in distilled water to a concentration of 28 µM and 40 ml of the resultant solution was stirred in a 35 mm diameter by 73 mm height quartz beaker. 0.05 grams of the powder being tested were added to the solution in the beaker. The solution was then stirred inside an enclosure designed to shield it from ambient light. The enclosure had one input port for solar simulator input illumination. The solar simulator had a 1 inch (25 mm) diameter output beam that was directed onto the center of the beaker. The solution was illuminated for a fixed period of time determined by the goal of the experiment, usually between 1 minute and 2 hours. The light source was in some cases filtered to exclude UV radiation using either a 400 nm or 450 nm long pass filter to test for visible light photocatalytic activity.

After the radiation exposure was complete, 4 ml of solution was sampled to measure the remaining concentration of methylene blue. The powder was separated from the solution by two stages of centrifugation, the first being a 14 minute 10K RPM centrifuge to eliminate the bulk of the powder, and the second being effected by transferring the solution to new centrifuge tubes and centrifuging again at 10K RPM for 10 minutes to ensure any remaining powder was separated. The solution was now scatter-free to avoid interference in the absorbance measurement.

Absorbance was measured with the optical fiber based UV-visible spectrophotometer relative to a pure distilled water reference. A fiber directing a xenon illumination source was mounted to a collimating lens aligned to a receiving fiber connected to the spectrophotometer. The sample solution or water reference was poured into a 10 mm light path length cuvette and placed in the light path before the receiving fiber. The stray light and electrical dark spectrum to be subtracted from each spectrum was measured by blocking the input light and recording the spectrum. The absorbance in units of optical density was calculated using the following Equation:

$$A(O.D.) = -\log[(Sample-Dark)/(Reference-Dark)]$$

The maximum absorption of methylene blue was found to occur at 663 nm, so powder performances are compared based on the absorbance of the solution at this wavelength. Pure solutions of known concentration are used to map the 663 nm absorbance value to molar concentration of the dye. However, it should be noted that a significant blue-shift in the absorption peak was observed during Aeroxide P25 degradation experiments. This blue-shift is evident in FIG. 6 and became larger with time. The source of the shift is associated with an N-dealkylation that merely bleaches the methylene blue but may leave the main aromatic ring backbone intact.

Minimal blue-shifting during degradation, as observed by powders synthesized using the Examples processes, suggests degradation of the methylene blue is more likely achieved by cleaving the bonds forming the aromatic rings.

Figure 6:
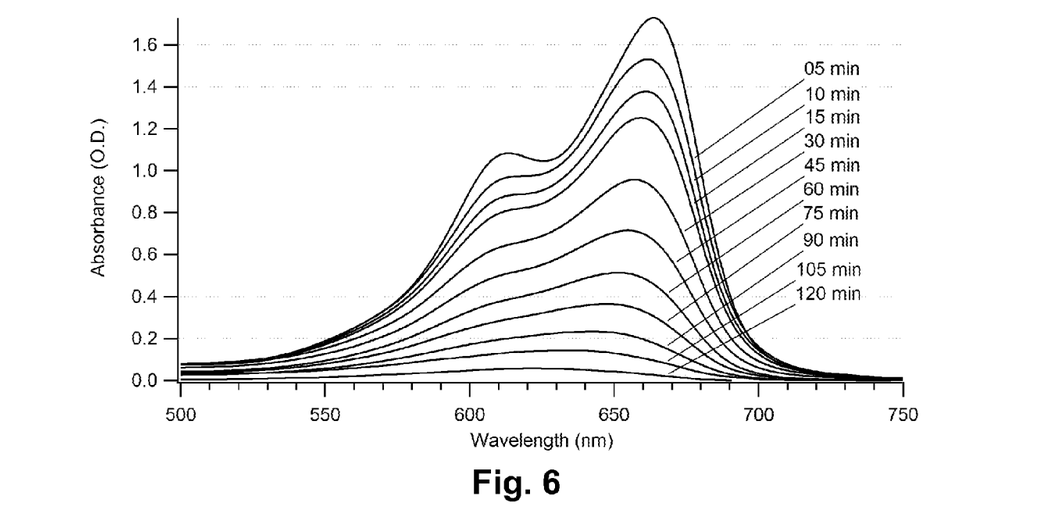
FIG. 6 is a graph showing the absorption spectrum of methylene blue solution after various periods of photocatalyzed decomposition using Aeroxide P25, as obtained in the experiments described in Example 8 below.
Figure 7:
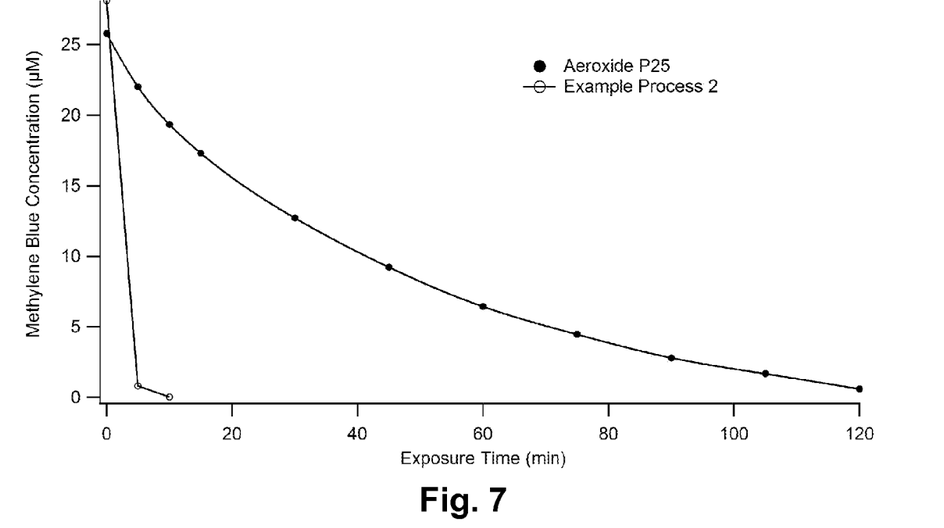
FIG. 7 is a graph showing the molar concentration of methylene blue solution after various periods of photocatalyzed decomposition using Aeroxide P25 and a visible light titania of the present invention, as obtained in the experiments described in Example 8 below.
Figure 8:
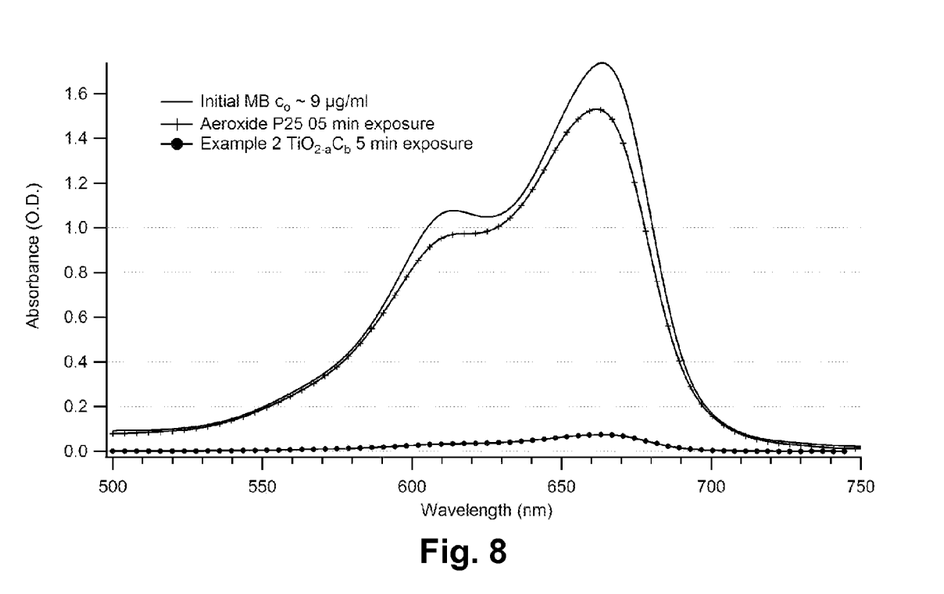
FIG. 8 is a graph showing the absorption spectrum of methylene blue solution after photocatalyzed decomposition using Aeroxide P25 and a visible light titania of the present invention, as obtained in the experiments described in Example 8 below.
Figure 9:
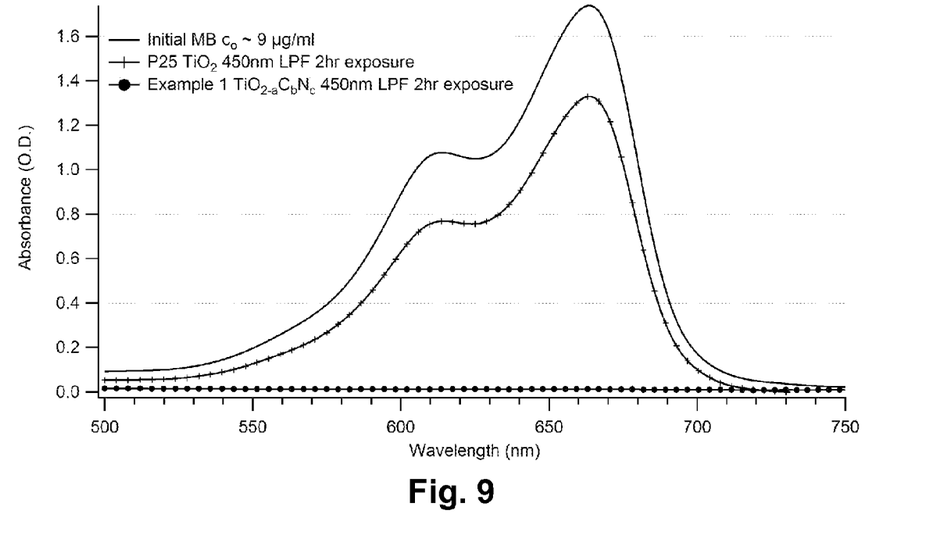
FIG. 9 is a graph similar to that of FIG. 8 but in which the photocatalyzed decomposition was effected using radiation filtered to pass only wavelengths longer than 450 nm, as described in Example 8 below.

FIGS. 6 and 7 shows the results of preliminary tests using Aeroxide P25, with FIG. 6 showing the absorbance spectrum of the methylene blue solution after various exposure times, and FIG. 7 showing the molar concentration as a function of exposure time. From FIGS. 6 and 7, it will be seen that the Aeroxide P25 powder requires approximately 2 hours to nearly fully degrade the methylene blue from the solution under the experimental conditions described above. Comparing the performance of the carbon and/or nitrogen-doped titania of the present invention to the Aeroxide P25 is done by fixing the illumination time of the experiment, measuring the dye concentration, and finding the time required by the Aeroxide P25 to achieve the equivalent dye concentration. For example, in one experiment using a carbon-doped titania powder (Example 2 above) and an illumination time of 5 minutes resulted in a dye concentration of 0.817 µM; the Aeroxide P25 achieved the same concentration after approximately 117 minutes of illumination time, so the carbon-doped titania powder showed a 23.4× improvement over the Aeroxide P25. The molar concentration versus exposure time for this example is also included in FIG. 7 and the absorbance spectra for this example are shown in FIG. 8. The same process can be repeated with light source filtration to test the visible responses of the powders. FIG. 9 shows the comparison of the Aeroxide P25 with the carbon-doped titania when filtering the input light source to pass only wavelengths longer than 450 nm. Based on the absorption spectrum of the Aeroxide P25 powder, it is not active at these wavelengths and any degradation of the methylene blue is attributed to self degradation. The carbon and nitrogen-doped titania degraded the methylene blue to levels below the detection level of the equipment used.

As an additional example of photocatalytic activity, 40 ml of a 15 µM aqueous solution of rhodamine B (RhB) dye may be photodegraded analogously to the methylene blue dye solution. In this case measurement of the absorbance at 553 nm is used to determine the remaining concentration of the RhB dye. Aeroxide P25 powder has been reported to be particularly efficient at photodegrading RhB with respect to other commercial forms of titania powders, but still required nearly 1 hour and 15 minutes to degrade the 15 µM solution below the detection level of the measurement apparatus. Powder synthesized using Example process 4 reduced the RhB concentration below the detection limit of the measurement apparatus after only a 5 minute exposure, which again demonstrates the superior photocatalytic degradation capabilities of the powders synthesized by the process of the present invention.

Figure 10:
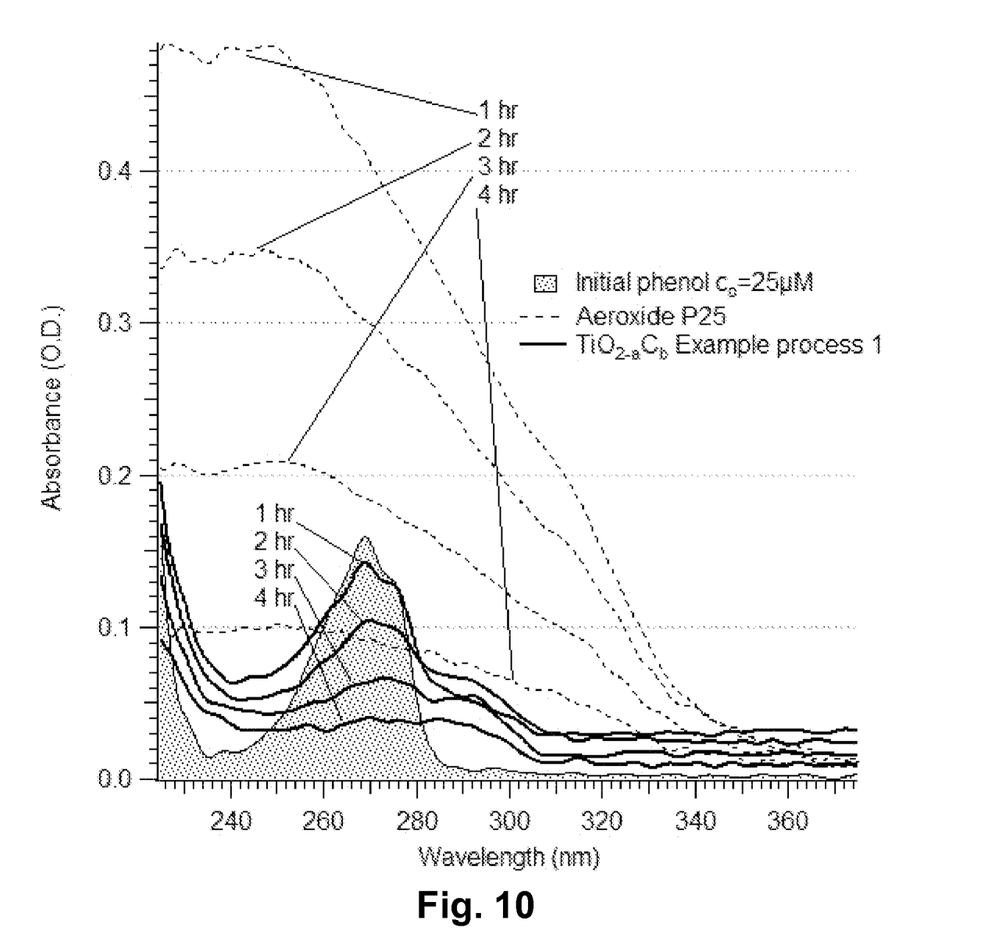
FIG. 10 is a graph similar to that of FIG. 8 but showing the photocatalyzed decomposition of phenol using Aeroxide P25 and a visible light titania of the present invention, as obtained in the experiments described in Example 8 below.

The photocatalytic degradation rate of phenol may also be monitored by the spectrophotometric technique. A pure aqueous solution of phenol has an absorption peak in the ultraviolet at 269 nm, so a 50 mm path length quartz cuvette is needed to detect the peak. Unfortunately the photocatalytic degradation of phenol is often associated with the formation of various intermediates and byproducts such as catechol, hydroquinone, benzoquinone, 1,2,4-benzenetriol, pyrogallol, etc. Not only are these congeners undesirable, they also have stronger and overlapping UV absorption bands that introduce large errors in the phenol concentration measurement using this technique. Photocatalytic degradation of phenol using the Aeroxide P25 powder could not be measured by this spectrophotometric method due to this effect. Reference 3 above has measured by liquid chromatography and reported the removal rate constant of phenol using Aeroxide P25 (formerly Degussa P25) powder to be approximately three times less than its removal rate constant of methylene blue. Powder synthesized using Example Process 1 above showed much less congener interference which allowed sensible phenol concentration measurements using the spectrophotometric technique. Similarly to the dye photodegradation procedure above, powders were tested by mixing 50 mg with 40 ml of oxygen bubbled 25 µM aqueous phenol solution and illuminated with the same solar simulating light source for 1 hour intervals. As evident in FIG. 10, after 4 hours the Example process 1 powder had eliminated nearly all the phenol and other reaction intermediates while the Aeroxide P25 still contains significant concentrations of phenol and/or its congeners.

While the invention has been described with reference to particular embodiments, it will be understood that the present invention is by no means limited to the particular formulations, and methods herein disclosed and/or shown in the drawings, but also comprises any modifications or equivalents within the scope of the claims. Other modifications of the specific example synthesis processes described above will readily be apparent to those skilled in the art of photocatalysis and photocatalytic materials.

The invention claimed is:

1. A process for preparing a titania having high visible light photocatalytic activity, the process comprising:
   (a) mixing titania with carbon powder;
   (b) heating the titania/carbon powder mixture to at least about 1000° C. in an inert or weakly reactive atmosphere; and
   (c) thereafter heating the resultant powder mixture to a temperature in the range of about 350 to about 1000° C. in an oxidizing atmosphere.

2. A process according to claim 1 wherein the titania and carbon mixed in step (a) of the process have average particles sizes less than about 100 nm.

3. A process according to claim 1 wherein step (b) is carried out in an atmosphere of inert gas.

4. A process according to claim 1 wherein step (b) is carried out in an atmosphere of inert gas with a minor proportion of oxygen and/or nitrogen.

5. An ultraviolet absorber that additionally absorbs high energy blue light for sunscreen, protective sunglasses, window glazing, or protection of plastics, fabrics, and other materials damaged by high energy blue light, comprising a nitrogen-doped titania produced by a process according to claim 4.

6. A process according to claim 1 wherein step (b) is carried out at a temperature in the range of about 1000 to about 1500° C.

7. A carbon-doped titania produced by a process according to claim 1 and having an XPS spectrum substantially as shown in FIG. 4A of the accompanying drawings.

8. A titania photoactive in visible light produced by a process according to claim 1 and showing at least about 3 percent Ti—C bonding by XPS.

9. A nitrogen-doped titania produced by a process according to claim 1 and having an XPS spectrum substantially as shown in FIG. 4B of the accompanying drawings.

10. A process for detoxifying and/or disinfecting a medium which comprises contacting said medium with a titania produced by a process according to claim 1, while illuminating the titania with visible and/or near infra-red radiation.

11. A process according to claim 10 wherein the material to be detoxified and/or disinfected is a liquid and the titania is added to the liquid as a powder.

12. A process according to claim 10 wherein the titania is coated on to or incorporated into a solid substrate such that materials in a medium in contact with said titania-coated surface of the solid substrate are detoxified, disinfected, and/or dissociated.

13. A process for generating hydrogen gas from an aqueous medium which comprises contacting said medium with a titania produced by a process according to claim 1 while illuminating the titania with visible light or near infra-red radiation.

14. A process according to claim 13 wherein particles of a noble metal are incorporated onto the titania.

15. A process according to claim 13 wherein a sacrificial electron donor is added to the aqueous medium.

16. A process according to claim 14 wherein the sacrificial electron donor is methanol.

* * * * *